(12) United States Patent
Lin

(10) Patent No.: US 7,798,687 B2
(45) Date of Patent: Sep. 21, 2010

(54) MODULAR LIGHT SYSTEM FOR AUTOMOBILES

(76) Inventor: Meiyin Lin, 24294 Lynwood Dr., Novi, MI (US) 48374

( * ) Notice: Subject to any disclaimer, the term of this patent is extended or adjusted under 35 U.S.C. 154(b) by 334 days.

(21) Appl. No.: 11/788,803

(22) Filed: Apr. 23, 2007

(65) Prior Publication Data

US 2008/0259628 A1    Oct. 23, 2008

(51) Int. Cl.
*F21V 11/00*    (2006.01)
(52) U.S. Cl. .................. 362/508; 362/487; 362/549
(58) Field of Classification Search ............... 362/487, 362/496, 505–507, 546, 549
See application file for complete search history.

(56) References Cited

U.S. PATENT DOCUMENTS

| | | | |
|---|---|---|---|
| 3,110,883 A * | 11/1963 | Nallinger et al. ............ 362/507 |
| 4,538,213 A | 8/1985 | Martin | |
| 4,556,931 A | 12/1985 | Wheatley | |
| 4,758,932 A * | 7/1988 | Coons ......................... 362/546 |
| 4,812,955 A * | 3/1989 | Beswick et al. ............. 362/240 |
| 4,893,226 A | 1/1990 | Neece | |
| 5,424,923 A * | 6/1995 | Young et al. ................ 362/549 |
| 6,312,145 B1 | 11/2001 | Rhoad | |

* cited by examiner

*Primary Examiner*—Sandra L O'Shea
*Assistant Examiner*—Danielle Allen

(57) ABSTRACT

An automotive modular light system, comprising a common base light device and a multitude of exchangeable lens cover means of which each has significantly distinct automotive light styling features, is invented here as a cost-effective way of customizing the exterior styling of motored vehicles. The common base light device of simple construction can be used for multiple vehicle models to provide the lighting function at a low cost. An exchangeable lens cover means, which provides the styling features of the modular light system, is removably installed to the common base light device. Each exchangeable lens cover means has a simple construction so that it can be cost-effectively manufactured. Therefore a multitude of exchangeable lens cover means of significantly distinct styling features may be offered to customers with different styling tastes at very affordable prices.

10 Claims, 16 Drawing Sheets

MODULAR LIGHT SYSTEM FOR AUTOMOBILES

FIELD OF THE INVENTION

Exterior styling of an automobile is arguably the most important attribute that attracts customers. Among many exterior styling features, such as body colors and shapes, front grill colors an shapes, door shapes and windows, and windshield, the head and tail light modules play critical roles of defining an automobile's exterior appearance.

A conventional automotive light module has two main functions—lighting and styling. This invention discloses a modular design of the automotive light system that separates the styling function of an automotive light module from the lighting function so the styling features of the light module can be easily and economically customized independently from the lighting function.

BACKGROUND

Description of Prior Art

A mass-production automobile model usually has a non-offensive but blend (i.e. conservative and boring) exterior styling so the automobile's styling is acceptable to more customers. This strategy leads to conservative and boring styling design of conventional light modules, including head lights, tail lights, and other signal lights, which are critical components for defining the styling of an automobile.

The styling of an automotive light module is mainly defined by various aesthetic characteristics such as shape, color, transparency, pattern, graphic, reflectivity, texture and surface finish of the lens cover which is the exposed portion of the housing of the light module. The housing is usually made of rigid plastic by injection molding with high development and tooling costs. The development and tooling processes for the automobile's surrounding parts, such as sheet metal or plastic body panels and front grill, which need to accommodate the light module, are also expensive. Therefore it is usually financially infeasible to have more than one design of a light module of significantly different styling features for a specific automobile model.

To avoid conservative and boring styling of their automobiles, many automobile buyers choose to customize their automobiles' styling after initial purchases. A popular customization option is to replace the stock head and tail light modules with aftermarket light modules with aggressive styling features such as bold colors, unique textures, unusual patterns, aggressive graphics, different reflectivity, and different surface finishes for custom styling features. Some aftermarket light modules are shown in FIG. 1.

However, aftermarket light modules are expensive, usually each pair costs about two hundred US dollars or more, because each light module manufactured carries high development and tooling costs due to low production volume of light modules of a specific custom design.

In addition, aftermarket light modules typically have the same outlines as the stock light modules so they can be readily installed in the same cavities of the automobile. This constraint significantly limits the potential of using aftermarket light modules to customize the styling of an automobile.

A cheaper option is to install light module covering devices such as aftermarket lens covers, as shown in FIG. 2, over stock head and tail light modules. Typical aftermarket lens covers have simple constructions such as thin injection or vacuum molded pieces with distinct shapes, colors, textures, reflectivity, and surface finishes as compared to conventional light modules.

An aftermarket lens cover is usually attached to the stock light modules via adhesive tapes or threaded fasteners. The adhesive tapes are applied between the stock light module and aftermarket lens cover around the perimeters for better attachment. The threaded fasteners are installed through the holes in the stock light module to existing OEM (Original Equipment Manufacturer) threaded holes in the vehicle body. Therefore an aftermarket lens cover normally has an outline similar to, if not exactly the same as, the stock light module. This significantly limits the potential of using aftermarket lens covers to customize the exterior styling of an automobile.

Other aftermarket light module covering devices are die-cut color-tinted films with or without graphics and semi-transparent spray-on paint to apply to the lens covers of the conventional light modules and they share same limitation as the aftermarket lens covers.

FIG. 3 shows some production automobiles before and after installation of the prior art aftermarket light modules and lens covers: a 2006 Mazda 6 with production tail light module 21 and aftermarket lens cover 22; a 2006 VW Beetle with production tail light modules 23 and aftermarket lens cover 24; a 2006 Subaru WRX with stock head light module 25 and aftermarket head light module 26; a 2006 VW Passat with an aftermarket tail light lens cover 27; and a 2006 Mazda Premacy with an aftermarket tail light lens cover 28. The aftermarket light modules and lens covers do make differences in exterior styling of these automobiles. But the differences are not significant enough because the shapes of the light modules cannot be easily changed and the costs of the aftermarket light modules are too expensive for normal customers.

U.S. Pat. Nos. 6,312,145 and 4,538,213 reveal lens cover designs that use snap-on attachment means to install to existing automobile headlights. U.S. Pat. No. 4,556,931 unveils protective lens cover for recessed automotive headlights. Each lens cover is removably attached to the inside surface of the opening of the recessed headlight with hook and loop (under trademark Velcro) fasteners. U.S. Pat. No. 4,893,226 also unveils transparent protective shields for recessed bumper-mounted automotive lights. Each protective shield attaches to the edges of the bumper opening surrounding the recessed light via adjustable clamps. However, in these patents the shapes of the lens covers/protective shields are required to be the same as the light modules or the opening of the recessed lights for installation. This significantly limits the potential of the aftermarket lens covers/protective shields to customize the exterior styling features of automobiles.

Objects and Advantages

The disclosed modular automotive light system separates the lens cover from an automotive light module so that a multitude of exchangeable lens covers with significantly distinct styling features can be manufactured for a specific automobile model at very affordable cost while the light module itself can be minimized as a low cost basic lighting device.

SUMMARY OF THE INVENTION

This invention discloses a modular automotive light system comprising a common base light device and a separate exchangeable lens cover means. The common base light device provides the function of lighting while the exchangeable lens cover means serves as a styling element as its only function. The exchangeable lens cover means is removably attached to the common base light device which itself is installed to an automobile like a conventional automotive light module.

Any one of a multitude of exchangeable lens cover means of significantly distinct styling features compatible to a specific common base light device can be selectively installed to the common base light device based on a customer's personal taste. An already installed exchangeable lens cover means may also be replaced by another compatible exchangeable lens cover mean with different styling features without replacing the common base light device and adjacent body panels, grills, and trim pieces.

The common base light device is a basic conventional automotive light module in its simplest form. A common base light device may be shared among different automobile models. The exchangeable lens cover means also has a simple construction for low cost as compared to that of a conventional automotive light module with comparable styling features. Therefore multiple exchangeable lens cover means of significantly distinct styling features and a common base light device may be manufactured for multiple automobile models at reasonable costs.

BRIEF DESCRIPTION OF DRAWING FIGURES

REFERENCE NUMERALS IN DRAWINGS

Figure 1:
FIG. 1 shows some prior art automotive aftermarket head and tail light modules.
Figure 2:
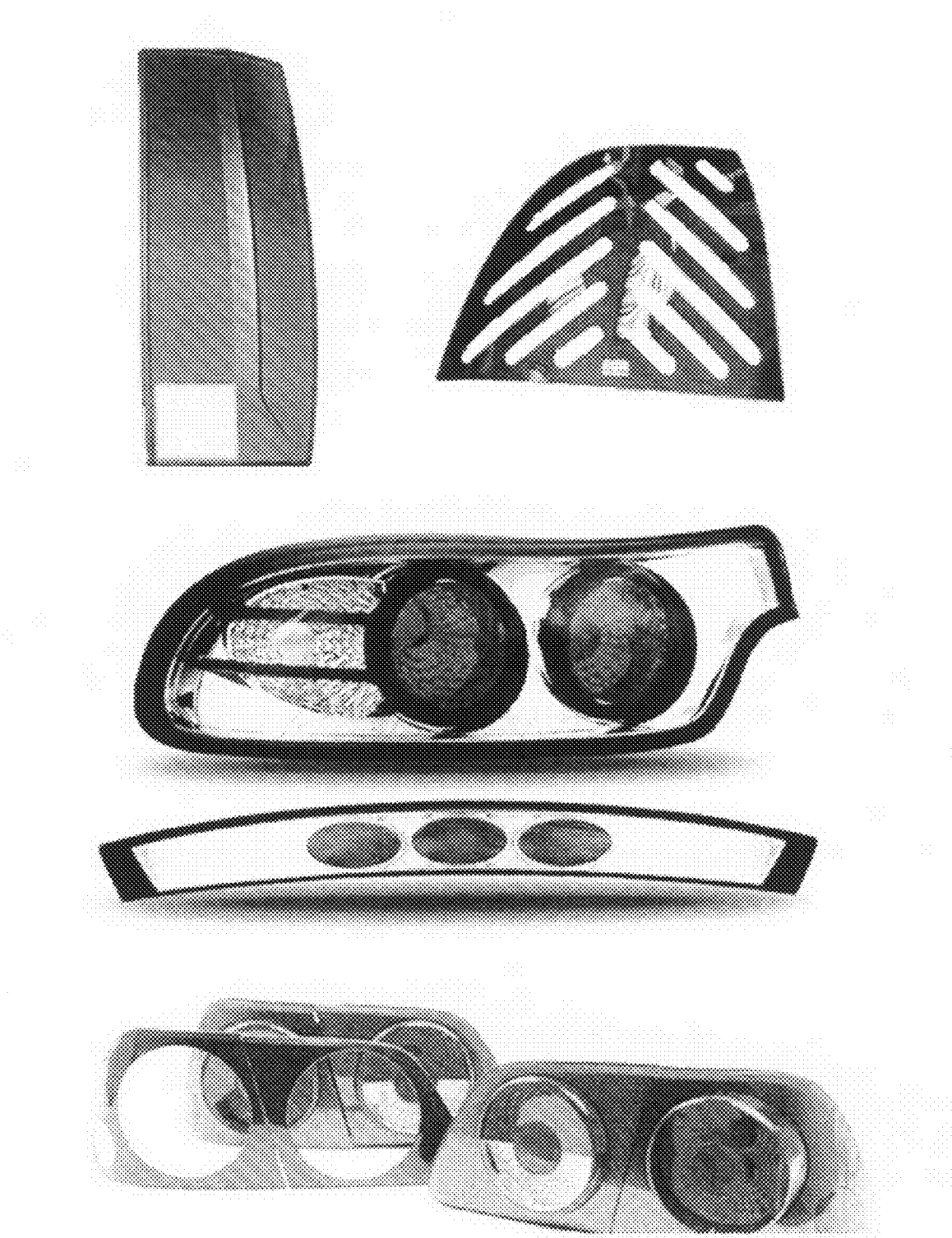
FIG. 2 shows some prior art automotive aftermarket lens covers.
Figure 3:
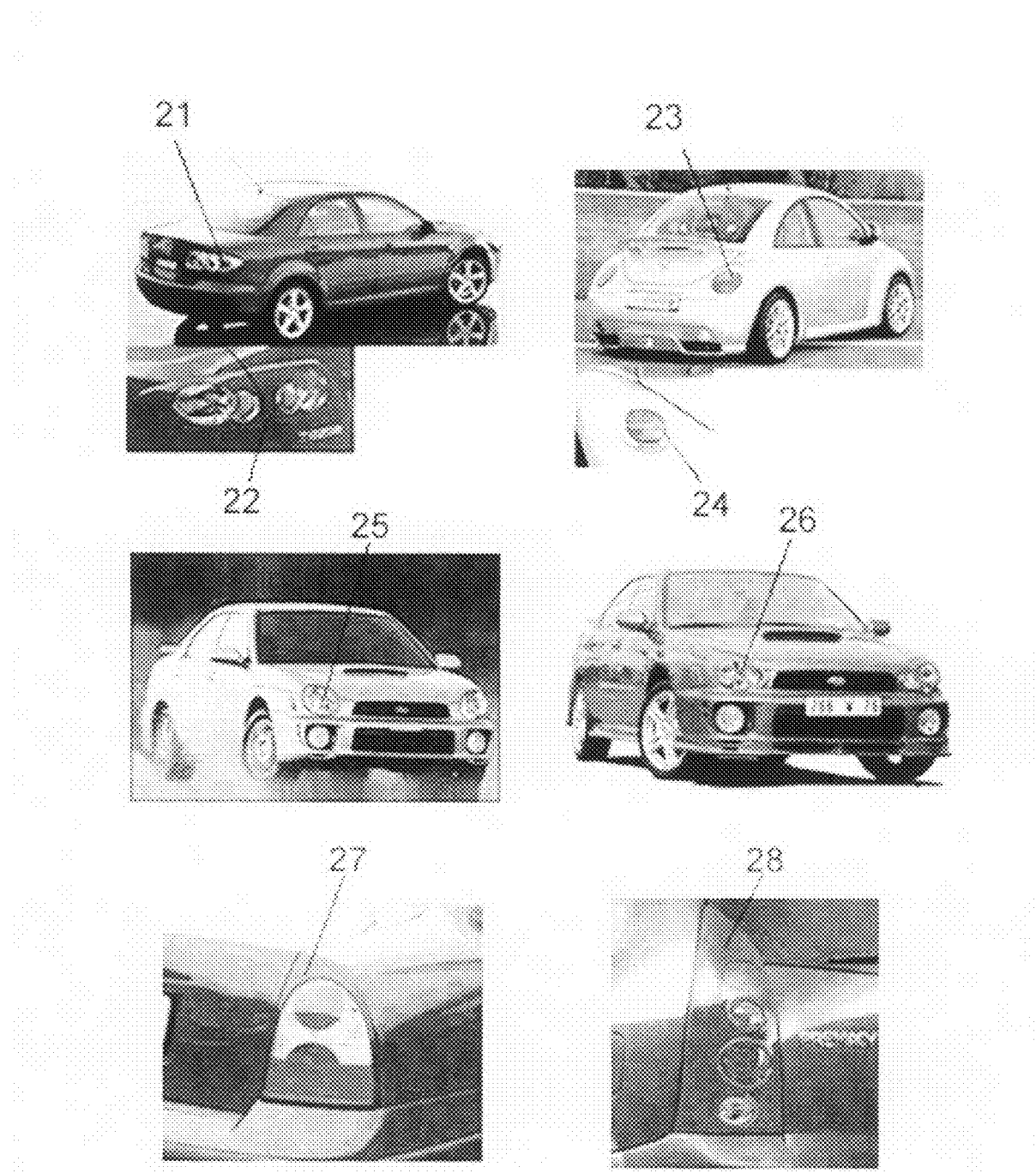
FIG. 3 shows some production automobiles before and after installation of the prior art aftermarket light modules and lens covers.

21. Stock tail light module in a 2006 Mazda 6
22. Prior-art aftermarket tail light lens cover in a 2006 Mazda 6
23. Stock tail light module in a 2006 VW Beetle
24. Prior-art aftermarket tail light lens cover in a 2006 VW Beetle
25. Stock head light module in a 2006 Subaru WRX
26. Prior-art aftermarket head light module in a 2006 Subaru WRX
27. Prior-art aftermarket tail light lens cover in a 2006 VW Passat
28. Prior-art aftermarket tail light lens cover in a 2006 Mazda Premacy
29. Pushpin receptacle socket molded-in or inserted with adhesive/interference-fit into a pre-drilled hole in the housing of light module or body panel
30. Threaded mounting bracket for light module
31. Common base light device
32. Housing of the common base light device or conventional light module
33. Exchangeable lens cover means
34. Plastic lens piece
35. Transparent window sections of plastic lens piece
36. Integrated styling features
37. Mechanical fastener attachment brackets
38. Female threaded fastener molded-in to the housing of the common base light device
39. Male threaded fastener
40. Through-hole
41. Metal styling devices with adhesive
42. Plastic styling device attached to the plastic lens piece via friction welding
43. Plastic styling devices with snap-fit geometric features
44. Metal styling devices with through-holes
45. Plastic graphic film with adhesive
46. Adjacent automotive body panel.
47. An extended portion of the exchangeable lens cover means overlaying an adjacent body panel.
48. Female threaded fastener attached with adhesive to the body panel or the housing of the common base light device or conventional light module
49. Hot-melt adhesive
50. Removable adhesive
51. Removable double-sided adhesive tape
52. Conventional automotive head light module
53. Conventional automotive tail light module
54. Pushpin receptacle socket with adhesive on the backing
55. Pushpin
56. Male snap-fit geometric feature
57. Female snap-fit geometric feature
58. Male twist-lock fastener
59. Female twist-lock fastener
60. Countersink
61. 3M Dual Lock reclosable fastener pad
62. Structural adhesive
63. Female threaded fastener inserted with interference-fit to a pre-drilled cavity in a body panel or the housing of a common base light module or a conventional light module
64. Female threaded fastener spot-welded to a sheet metal body panel
65. Pushpin with structural adhesive on the head 66. Washer/spacer for mechanical fasteners
67. Pushpin with female twist-lock feature on the head
68. Female twist-lock feature in the head of a mechanical fastener
69. Male twist-lock feature in a countersink in the exchangeable lens cover means
70. Cutoff hole of a plastic graphic film
71. Stock tail light module in a 2002 Mercury Villager
72. Modular tail light system in a 2002 Mercury Villager
73. Stock tail light module in a 2005 Ford Focus
74. Modular tail light systems in a 2005 Ford Focus
75. Stock head light module in a 2006 Ford F-150
76. Modular head light systems in a 2006 Ford F-150

DETAILED DESCRIPTION OF THE PREFERRED EMBODIMENTS

In this invention an automotive light module is divided into two functional units—a common base light device and an exchangeable lens cover means. The common base light device has a dedicated function of lighting while the exchangeable lens cover means has a sole function of styling. Each modular automotive light system consists of a common base light device and a number of exchangeable lens cover means.

Figure 4:
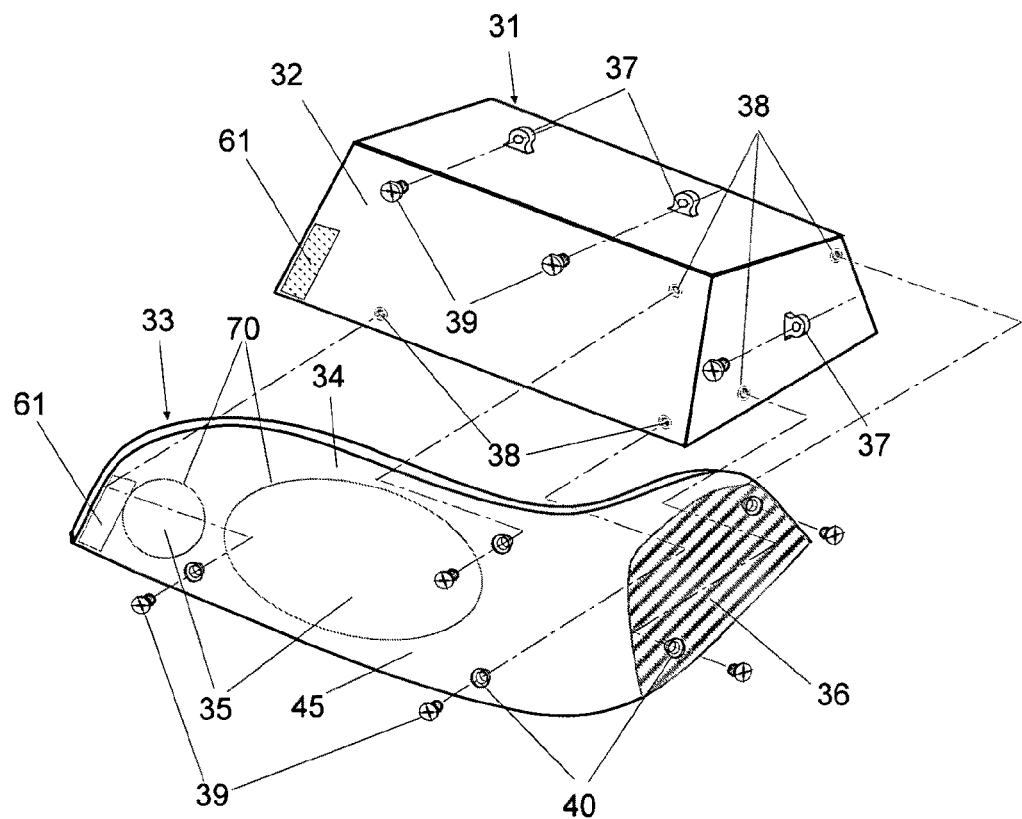
FIG. 4 shows the modular automotive light system with a common base light device, an exchangeable lens cover means, and a set of threaded mechanical fasteners.

The common base light device 31 is a basic conventional automotive light module in its simplest form, as shown in FIG. 4. It has a housing 32 enclosing an automotive lighting means that converts electricity to light and delivers the light in a predetermined manner such as a light beam or scattered light. This automotive lighting means comprises at least one light source, relevant optical components such as reflectors, deflectors, lenses, and diffusers, and necessary electrical components such as wiring, electric circuits, and connectors.

The common base light device therefore has a simple construction as compared to a conventional automotive light module which serves both the lighting and styling functions. A common design of the common base light device may be shared among different automobile models of different sizes, constructions, and styling because the requirements for lighting for most, if not all, automobiles are the same.

Figure 9:
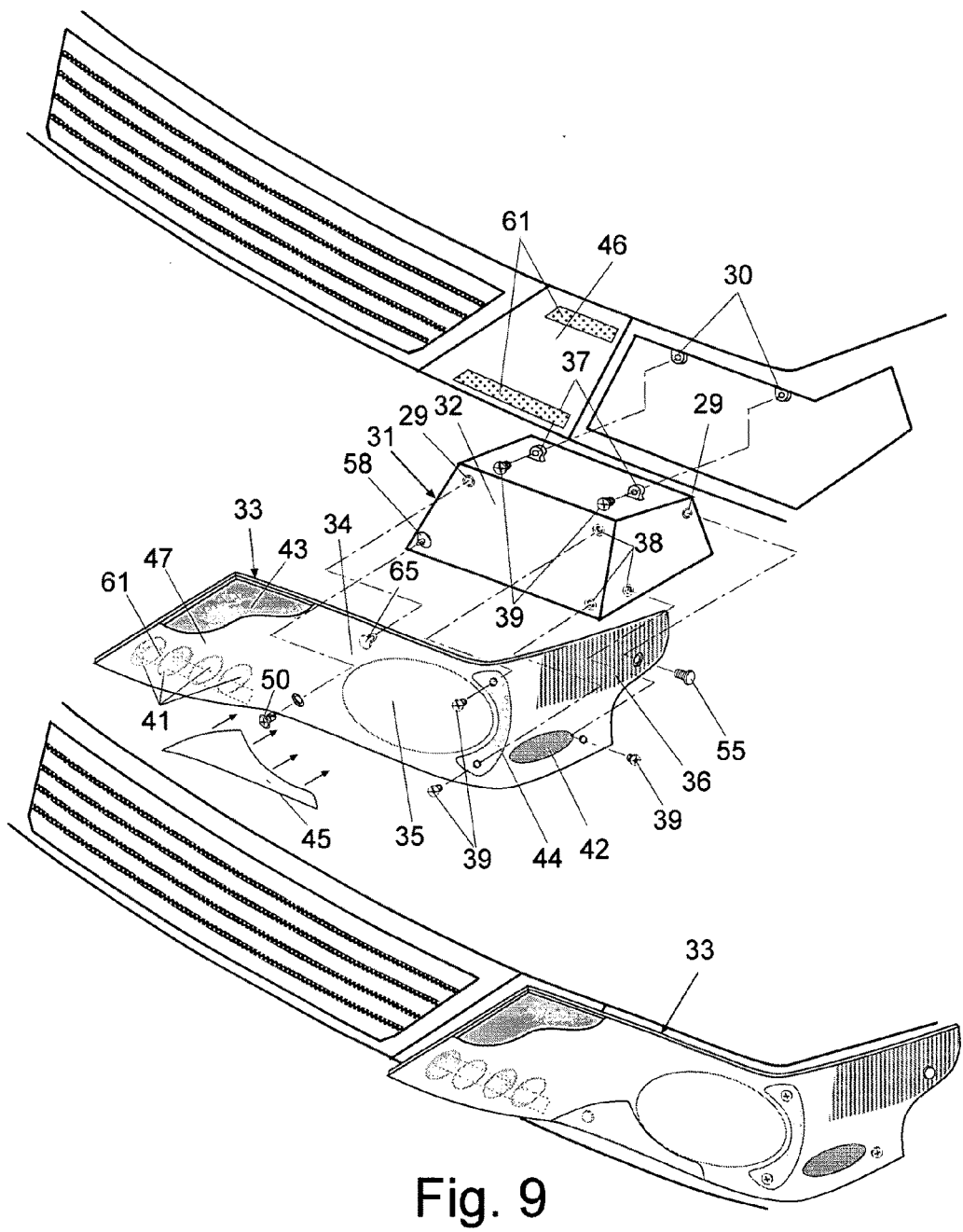
FIG. 9 shows the exploded and final assembly views of the first preferred embodiment of the modular automotive light system installed to an automobile.
Figure 10:
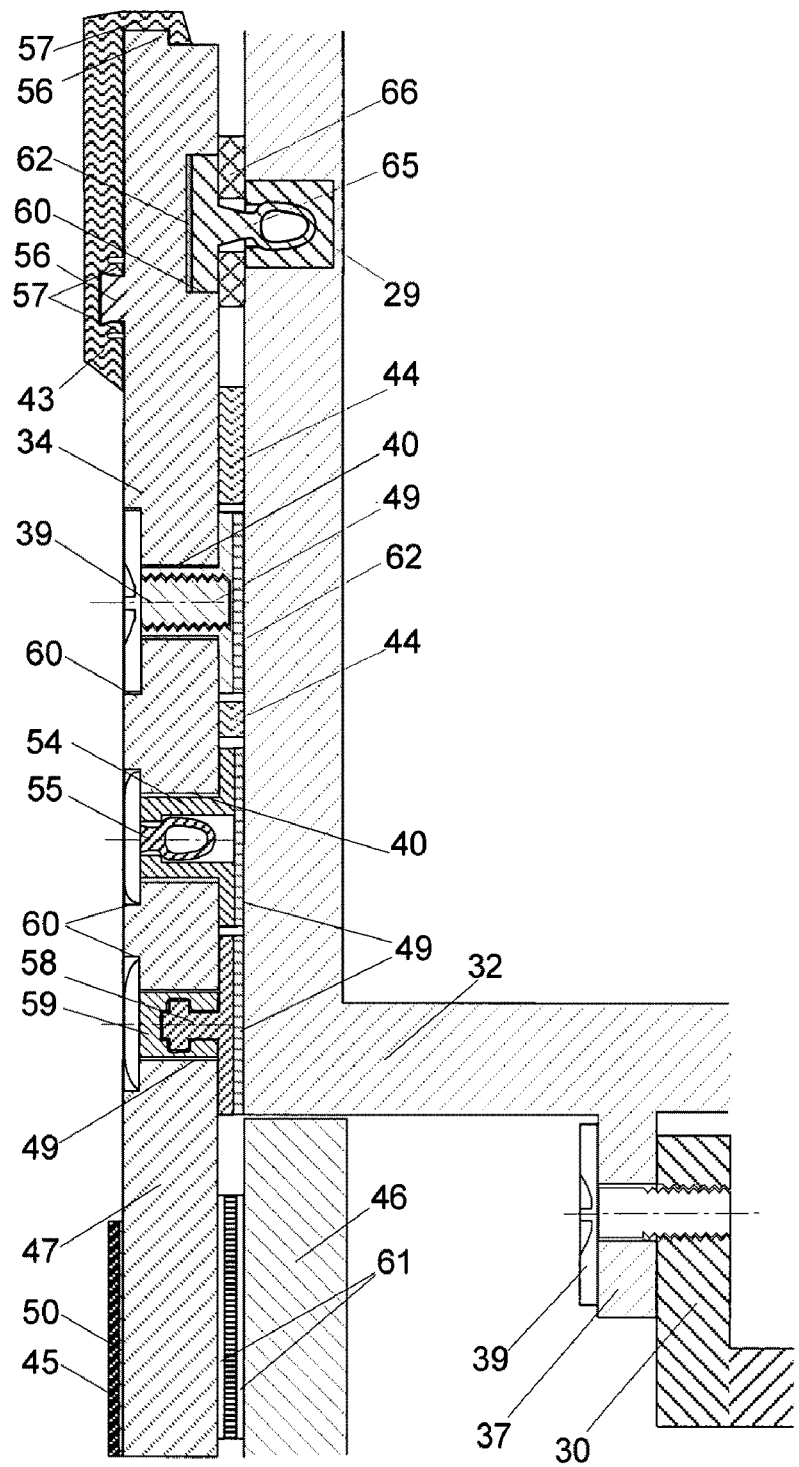
FIG. 10 shows the cross-sectional view of the first preferred embodiment of the modular automotive light system.

The common base light device is installed to an automobile in place of a conventional light module as shown in FIGS. 9 and 10. The installation, which is similar to installation of conventional automotive light modules, uses male threaded fasteners 39 to attach the mechanical fastener attachment brackets 37 of the housing 32 to the threaded mounting brackets 30 of the automobile.

The exchangeable lens cover means 33, as shown in FIG. 4, provides the styling features of the modular automotive light system. Each exchangeable lens cover means 33 comprises a plastic lens piece 34 with integrated styling features and add-on styling devices. The plastic lens piece 34 itself is a thin-walled transparent or semi-transparent plastic piece made with injection-molding, blow molding, vacuum-molding, thermoforming, or other plastic forming processes. Each plastic lens piece may be a one-piece plastic part or a multi-layered piece with thin plastic pieces bonded together.

The aesthetic characteristics come with the plastic lens piece, such as shape, color, transparency, texture, and surface finish, etc. are called integrated styling features. Other aesthetic characteristics such as graphics, patterns, reflectivity, diffusivity, and polarity, etc., that are molded-in, printed-on, coated-on, plated-on, or painted-on to the plastic lens piece or sandwiched between layers of a multilayered plastic lens piece are also called integrated styling features. One example, as shown in FIG. 4, is a pattern 36 painted on the inner surface of the plastic lens piece 34.

Figure 5:
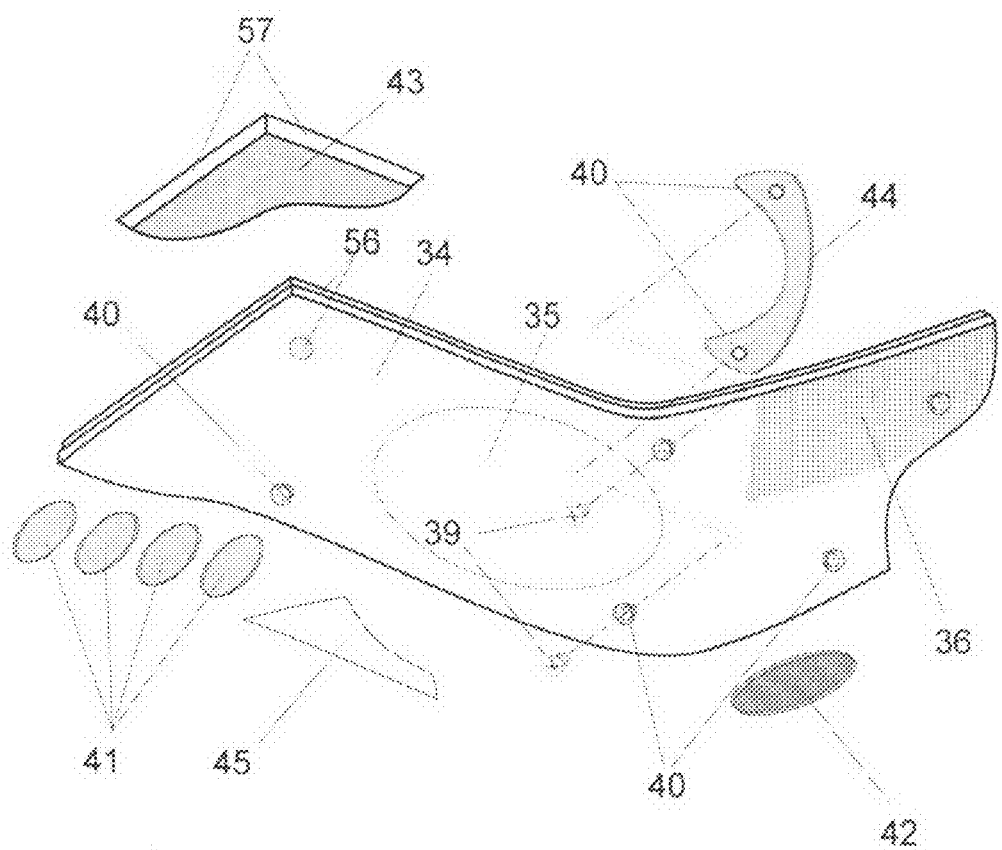
FIG. 5 shows the installation of various add-on styling devices to a plastic lens piece to make a complete exchangeable lens cover means.
Figure 5:
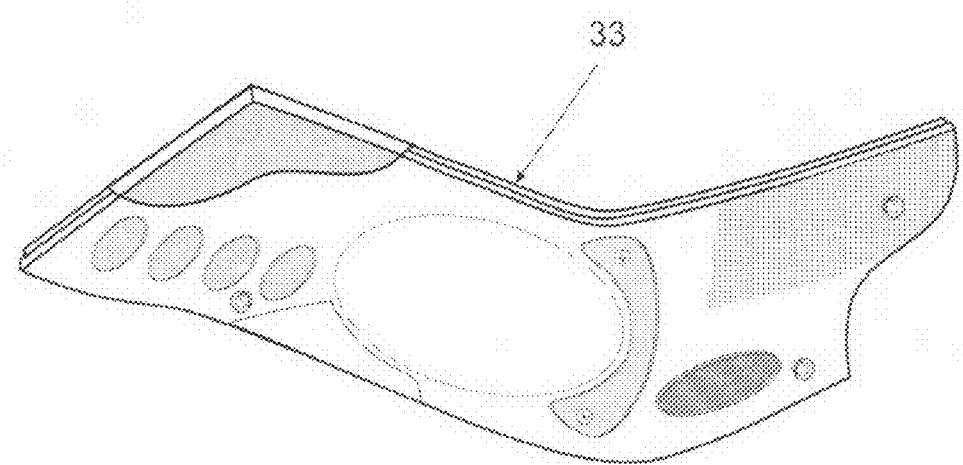

The plastic or metal pieces with various aesthetic characteristics such as shapes, colors, textures, surface finishes, transparency, diffusivity, reflectivity, deflectivity, polarity, graphics, and patterns that can be installed to the plastic lens piece as attachments are called add-on styling devices. The exploded and final assembled views of the exchangeable lens cover means 33 with add-on styling devices are illustrated in FIG. 5.

The add-on styling device 41 is a metal piece attaches with adhesive to the outer surface of the plastic lens piece 34. The add-on styling device 42 is a plastic piece attaches to the outer surface of the plastic lens piece 34 via friction welding. The add-on styling device 43 is installed to the plastic lens piece 34 via snap-fit features 56 and 57, which are also shown in FIG. 10. The add-on styling device 44 is a metal piece with two through-holes 40 for installation in between the lens cover means 33 and the housing 32 of the common base light device 31 via mechanical fasteners such as male threaded fasteners 39 as shown in FIG. 9. The add-on styling device 45 is a soft plastic film piece attaches to the outer surface of the plastic lens piece 34.

Each exchangeable lens cover means 33, after fitted with the integrated and add-on styling features, has styling features that simulate a conventional automotive light module. An exchangeable lens cover means 33 for head light module may have a few transparent window sections 35 that allow light from the common base light device 31 to pass through completely when the exchangeable lens cover means 33 is installed to the common base light device 31. FIG. 4 shows an exchangeable lens cover means 33 with a plastic lens piece 34 having a silver color tinted film with two oval holes 70 on its inner surface 45 as the add-on styling device and a molded-in pattern 36 as an integrated styling feature. The two cutoff oval holes 70 of the silver color tinted film make two transparent window sections 35 for the lens cover means.

Figure 6A:
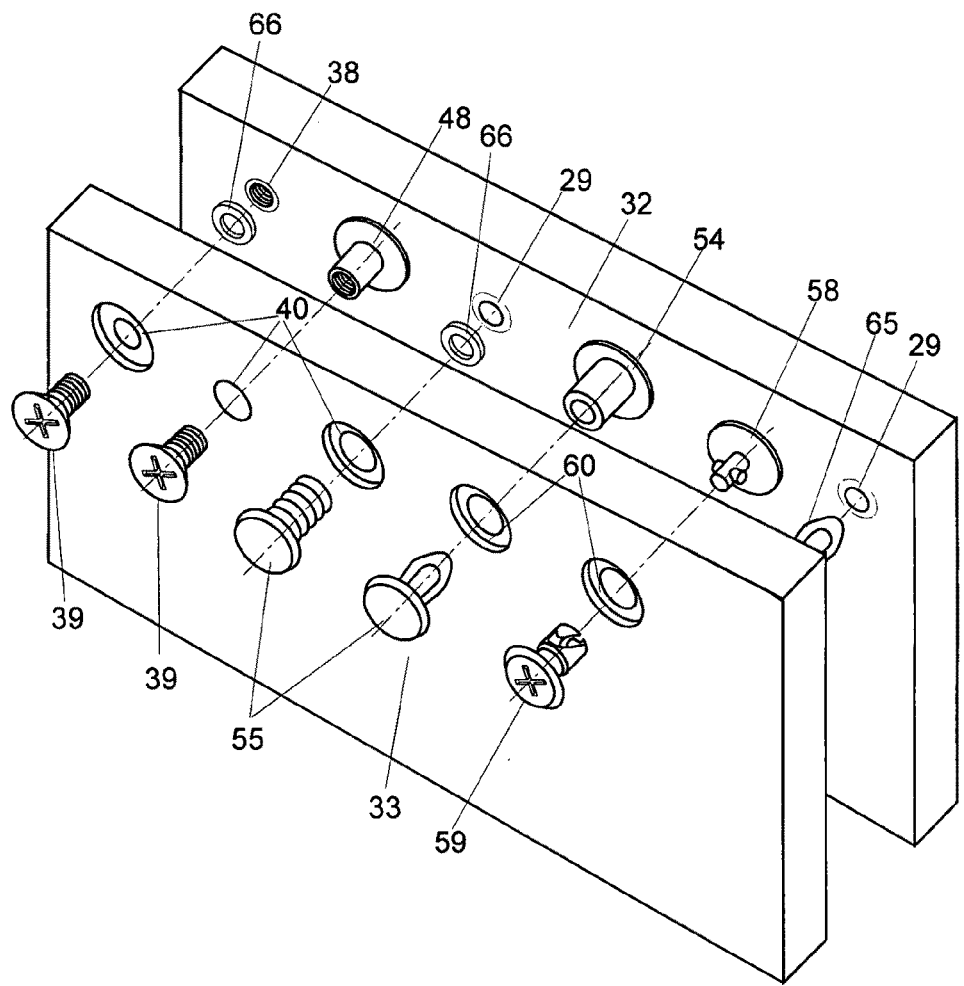
FIGS. 6a and 6b show various examples of the mechanical fasteners that attach the exchangeable lens cover means to the housing of the common base light device of an automobile.
Figure 6B:
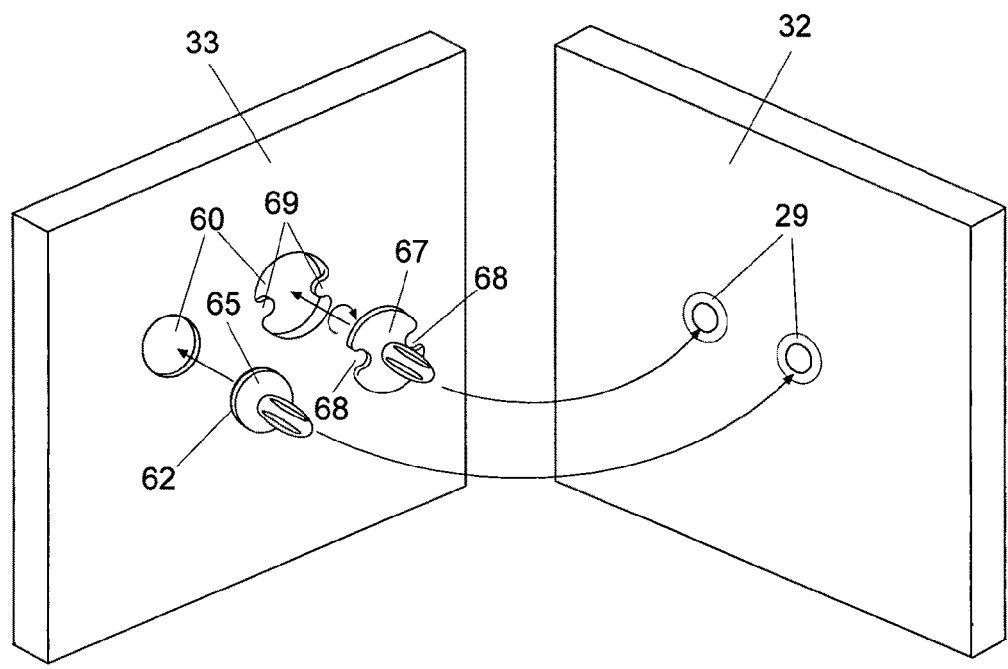

Each exchangeable lens cover means is removably attached to the housing of the common base light device via removable attachment means. Examples of the removable attachment means are pairs of mechanical fasteners with compatible fastener retaining means, removable adhesive, double-sided tapes with removable adhesive, hot-melt adhesive, interlocking fasteners, and magnetic tapes, etc. Examples of mechanical fasteners, such as threaded fastener pairs, pushpins and receptacle sockets, and twist-lock fastener pairs, etc., used to attach the exchangeable lens cover means 33 to the common base light device 31 are shown in FIGS. 4, 6a, and 6b. A cross-sectional view of the installation of the exchangeable lens cover means 33 to the housing 32 of the common base light device with various mechanical fasteners is shown in FIG. 7.

Each set of mechanical fastener consists of a retained mechanical fastener, an engaging mechanical fastener, and a compatible fastener retaining means. A retained mechanical fastener, such as a female threaded fastener (e.g. a threaded nut), is the fastener installed to the housing of the common base light device and stays stationary. An engaging mechanical fastener, such as a male threaded fastener (e.g. a screw or bolt), is the fastener that turns or pushes to the matching retained mechanical fastener for engagement. A fastener retaining means is a feature between the exchangeable lens cover means and an engaging mechanical fastener that retains the engaging mechanical fastener to the exchangeable lens cover means. One example is a through-hole that has diameters larger than the stem of the engaging mechanical fastener but smaller than its head.

Figure 7:
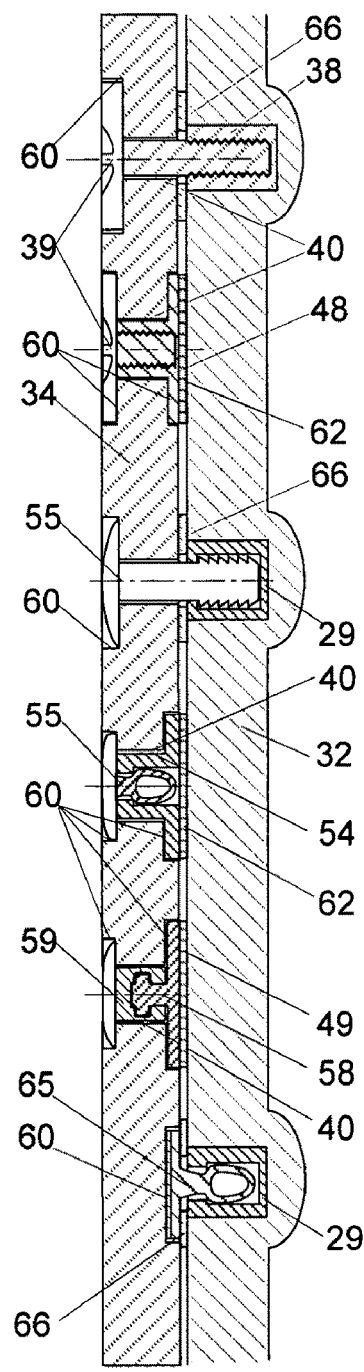
FIG. 7 shows the cross-sectional view of installations of various mechanical fasteners that attach an exchangeable lens cover means to the housing of a common base light device of an automobile.

The male threaded fasteners 39, as shown in FIGS. 6a, 6b, and 7, are engaging mechanical fasteners that install to the female threaded fasteners 38 and 48 as the matching retained mechanical fasteners. Other examples of mechanical fasteners are pushpins 55, 65, and 67, which are the engaging mechanical fasteners, and receptacle sockets 29 and 54, which are the retained mechanical fasteners. Also shown are female twist-lock fasteners 59, which are the engaging mechanical fasteners, and male twist-lock fasteners 58, which are the retained mechanical fasteners.

The retained mechanical fasteners are attached via various structural attachment means such as molded-in, friction welded, glued with structural adhesive, affixed with hot-melt adhesive, or interference inserted to the housing of the common base light device. Examples in FIG. 7 are a female threaded fastener 38 that is molded-in to the housing 32 of the common base light device, a female threaded fastener 48 or a T-nut that is glued with structural adhesive 62 to the housing 32, and a receptacle socket 29 inserted with interference-fit into a pre-drilled cavity in the housing 32. Also shown in FIG. 7 are a receptacle socket 54 glued to the housing 32, a male twist-lock fastener 58 installed with hot-melt adhesive 49 to the housing 32, and a receptacle socket 29 inserted with adhesive into a pre-drilled cavity in the housing 32.

The fastener retaining means retains an engaging mechanical fastener to the exchangeable lens cover means when the engaging mechanical fastener is installed to the matching retained mechanical fastener. Examples of the fastener retaining means, as shown in FIG. 6a, are the through-holes 40 in the exchangeable lens cover means 33 for the engaging mechanical fasteners 39, 55, and 59 that have diameters larger than the stems of the engaging mechanical fasteners but smaller than their heads, respectively. Structural attachment means, such as the structural adhesive 62 in FIGS. 6b and 7, applied between an engaging mechanical fastener and the exchangeable lens cover means to retain the head of the engaging mechanical fastener, such as the pushpin 65 in FIG. 6b, to the inner surface of the exchangeable lens cover means is another example of fastener retaining means. The optional countersink 60 here improves the retaining capacity and also helps to keep the head of the pushpin 65 flush with the inner surface of the exchangeable lens cover means. One other example of the fastener retaining means in FIG. 6b is the interlocking feature 68 in the head of the pushpin 67 and the matching interlocking feature 69 in a countersink 60 on the inner surface of the exchangeable lens cover means 33 that retain the pushpin 67 to the exchangeable lens cover means.

The countersinks 60 on the outer surface of the exchangeable lens cover means 33 in FIG. 6a for engaging mechanical fasteners 39, 55, and 59 are optional features that allow the fastener's heads to be flush with the outside surface of the exchangeable lens cover means 33 when installed. The countersink 60 on the inner surface of the lens cover means 33 in FIGS. 6b and 7 is also an optional feature for the fastener retaining means that enables the head of the pushpin 65 to be flush with the inner surface of the lens cover means and may help to retain the pushpin 65 better. The washers 66 in FIGS. 6a and 7 are also optional for improvement of the retaining capacity of the mechanical fasteners and may also be used as spacers between the exchangeable lens cover means and the common base light device.

There are other removable attachment means may be used to attach the exchangeable lens cover means to the common base light device. An example is shown in FIG. 4 where a pair of 3M's Dual Lock Reclosable fastener pads 61, are used to removably attach the exchangeable lens cover means to the housing 32 of the common base light device 31. Hook-and-loop fasteners (under trade name Velcro), may also be used here. Other removable attachment means are repositionable adhesive tapes, removable adhesive, hot-melt adhesive, suction cups, snap-on/interference-fit features between the lens cover means and the housing of the common base light device, and magnetic tapes with adhesive backing, etc. Those removable attachment means may be called nondestructive removable attachment means because they don't cause permanent changes, such as pre-drilled holes and permanent attachment of mechanical fasteners via structural adhesive to the common base light device or the lens cover means, to the lens cover means or the common base light device.

The advantage of those nondestructive removable attachment means over the mechanical fasteners is that there is no need for through-holes in the exchangeable lens cover means and no exposed mechanical fastener heads after the lens cover means is installed to the common base light device. The disadvantage is that those nondestructive removable attachment means are usually not as good as mechanical fasteners, especially the threaded fasteners, in attachment strength, durability, weather resistance, and reusability. Therefore the mechanical fasteners are usually used to anchor the exchangeable lens cover means to the light module while the nondestructive removable attachment means are used for reinforcement. However, with proper design the nondestructive removable attachment means may be used alone for attachment of the lens cover means to the common base light device without any mechanical fasteners.

Figure 8:
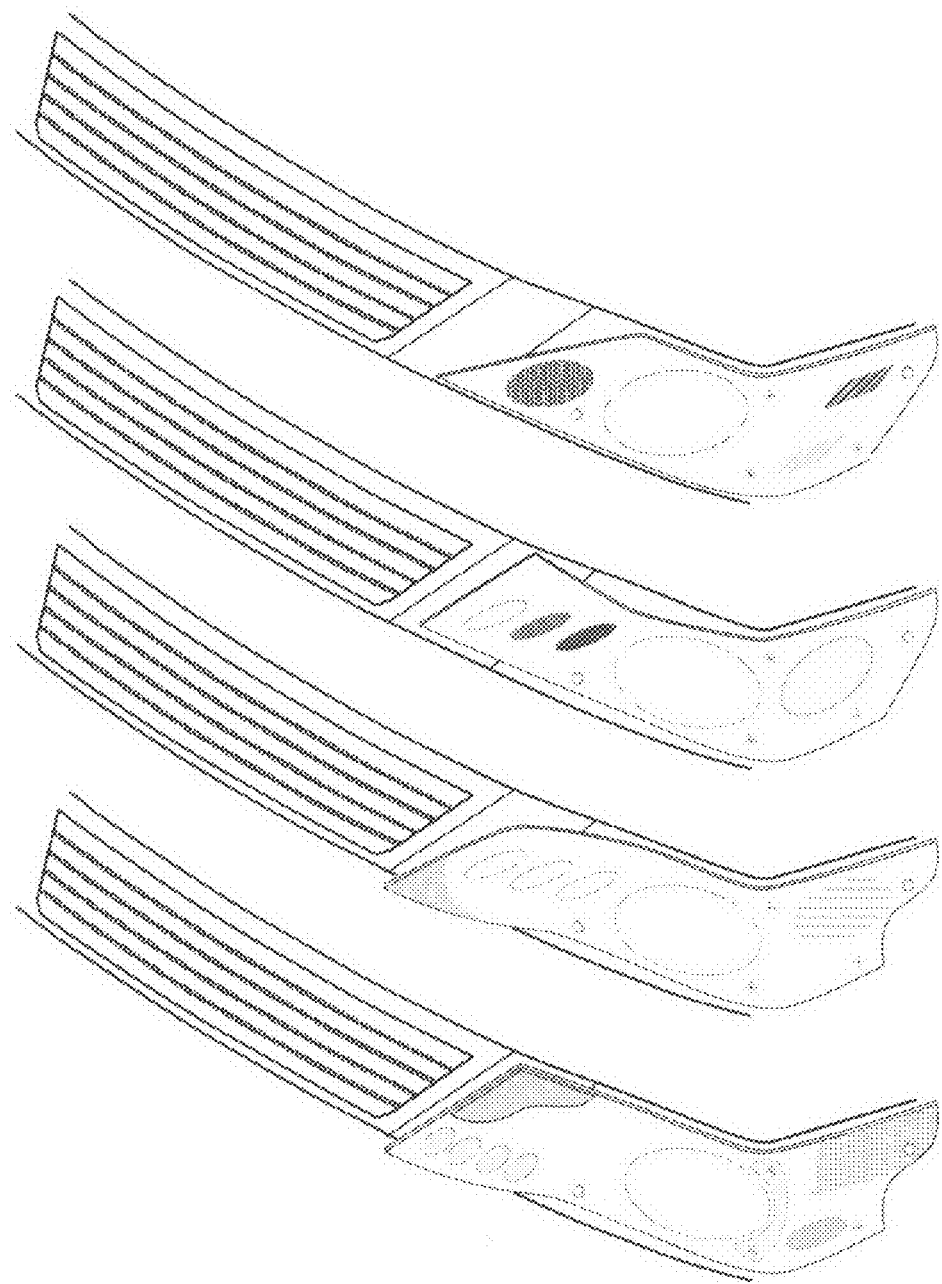
FIG. 8 shows the modular automotive light system comprises one common base light device and four compatible exchangeable lens cover means with significantly distinct styling features.

A multitude of exchangeable lens cover means with distinct automotive light styling features, as shown in FIG. 8, may be exchangeably and removably installed to a common base light device as long as the lighting function of the common base light device 31, as shown in FIG. 4, is not negatively affected by the presence of the exchangeable lens cover means 33, and the shapes of the exchangeable lens cover means comply with the housing 32 of the common base light device and the adjacent body panels 46, bumper covers, grills, and trim pieces of the automobile. An already installed exchangeable lens cover means may also be replaced by another exchangeable lens cover means with different styling features to refresh an automobile's exterior styling without changing the common base light device or the body panels, bumper cover, trims, and grills of the automobile.

The first preferred embodiment of the modular automotive light system installed to a vehicle, as shown in FIG. 9 for the exploded and final assembly views, has a common base light device 31 and an exchangeable lens cover means 33. The common base light device 31 is first installed to the automobile by attaching the mechanical fastener attachment brackets 37 of the housing 32 to the threaded mounting brackets 30 of the vehicle via male threaded fasteners 39 just like the installation of a typical conventional automotive light module.

The exchangeable lens cover means 33, as shown in FIG. 9, consists of a plastic lens piece 34 with an integrated styling feature 36 and a transparent window section 35 that lets out the light from the common base light device 31. The exchangeable lens cover means 33 is removably attached to the common base light device 31 via six sets of mechanical fasteners. As shown in FIG. 9, there are three pairs of threaded mechanical fasteners 38 and 39 with through-holes 40, a pushpin 55 and a molded-in pushpin receptacle socket 29 with a through-hole 40, a female twist-lock fastener 59 and a glued male twist-lock fastener 58 with a through-hole 40, and a pushpin 65 glued to a countersink 60 on the inner side of the exchangeable lens cover means with structural adhesive and the matching molded-in pushpin receptacle socket 29.

The cross-sectional view of the first preferred embodiment is shown in FIG. 10. The male threaded fastener 39 attaches the mechanical fastener attachment bracket 37 of the common base light device 31 to the threaded mounting bracket 30 of the automobile. The exchangeable lens cover means 33 is attached to the housing 32 of the common base light device 21 via mechanical fasteners with nondestructive removable attachment means for reinforcement. A pushpin 65 is retained to the inner surface of the exchangeable lens cover means 33 via structural adhesive 62 and is installed to a matching receptacle socket 65 which is molded-in to the housing 32 of the common base light device. A washer 66 is used as a spacer here but it may also enhance the engagement/tightness of the push fastener 62 in its receptacle socket 29. A male threaded fastener 39 is installed through a through-hole 40 in the exchangeable lens cover means 33 to a matching female threaded fastener 49 glued via structural adhesive 62 to the housing 32. A countersink 60 allows the head of the male threaded fastener 39 to be flush with the outer surface of the exchangeable lens cover means 33. Another push fastener 55 is installed through a through-hole 40 of the exchangeable lens cover means 33 to a matching receptacle socket 54 glued with hot-melt adhesive to the housing 32. A female twist-lock fastener 59 is installed through a through-hole 40 to a matching male twist-lock fastener 58 glued with hot-melt adhesive 49 to the housing 32.

Two pairs of 3M's Dual Lock Reclosable fastener pads 61, as shown in FIGS. 9 and 10, are used to removably attach an extended portion 47 of the exchangeable lens cover means to an adjacent body panel 46 overlaid by the extended portion 47 for reinforcement of the mechanical fasteners.

Also shown in FIG. 10 are installations of the add-on styling devices. Add-on styling device 43 is a plastic piece with a female snap-fit geometric feature 57 that snaps to the matching male snap-fit geometric feature 56 in the outer surface of the plastic lens piece 34. Add-on styling device 44 is a sheet metal piece with two through-holes 40 that is installed between the plastic lens piece 34 and the housing 32 of the common base light device 31 via the threaded fasteners 39 and 48, which are also used for attaching the exchangeable lens cover means 33 to the common base light device 31. A strip of graphic film 45 is attached to the outer surface of the plastic lens piece 34 with removable adhesive 50 on the backing.

The common base light device is a basic automotive light module in its simplest form. The tooling and manufacturing costs, as compared to a conventional automotive light module, can be minimized. Each exchangeable lens cover means can be tooled and manufactured very cost-effectively because it also has a simple construction as compared to a conventional automotive light module. A common base light device design may be shared among more than one automobile models.

This also allows common designs of the body panels and grills surrounding the common base light device across different automobile models and further reduces the automobiles' development, tooling, and manufacturing costs. Multiple exchangeable lens cover means of significantly distinct styling features for a common base light device for one or more automobile models may be used to attract customers of different styling tastes at very reasonable prices.

The second preferred embodiment has a stand-alone exchangeable lens cover means that removably attaches to an existing conventional light module of an automobile to enhance the styling of the conventional light module. In this embodiment the automobile's existing conventional light modules are used as the common base light devices for the exchangeable lens cover means to attach to. Similar to the first preferred embodiment, the exchangeable lens cover means has a plastic lens piece with integrated styling features 36, mechanical fasteners and fastener retaining means for anchoring, nondestructive removable attachment means for reinforcement, and add-on styling devices.

The installation of the lens cover means in the second preferred embodiment is primarily through mechanical fasteners with nondestructive attachment means as reinforcement similar to the first preferred embodiment. The only exception is the retained mechanical fasteners can not be molded-in to the housing of the existing automobile's existing conventional light modules. Typically the retained mechanical fasteners are glued with structural adhesive to the housing of the head light module. If necessary the retained mechanical fasteners can also be inserted into pre-drilled holes in the housing of the existing light module.

Figure 11:
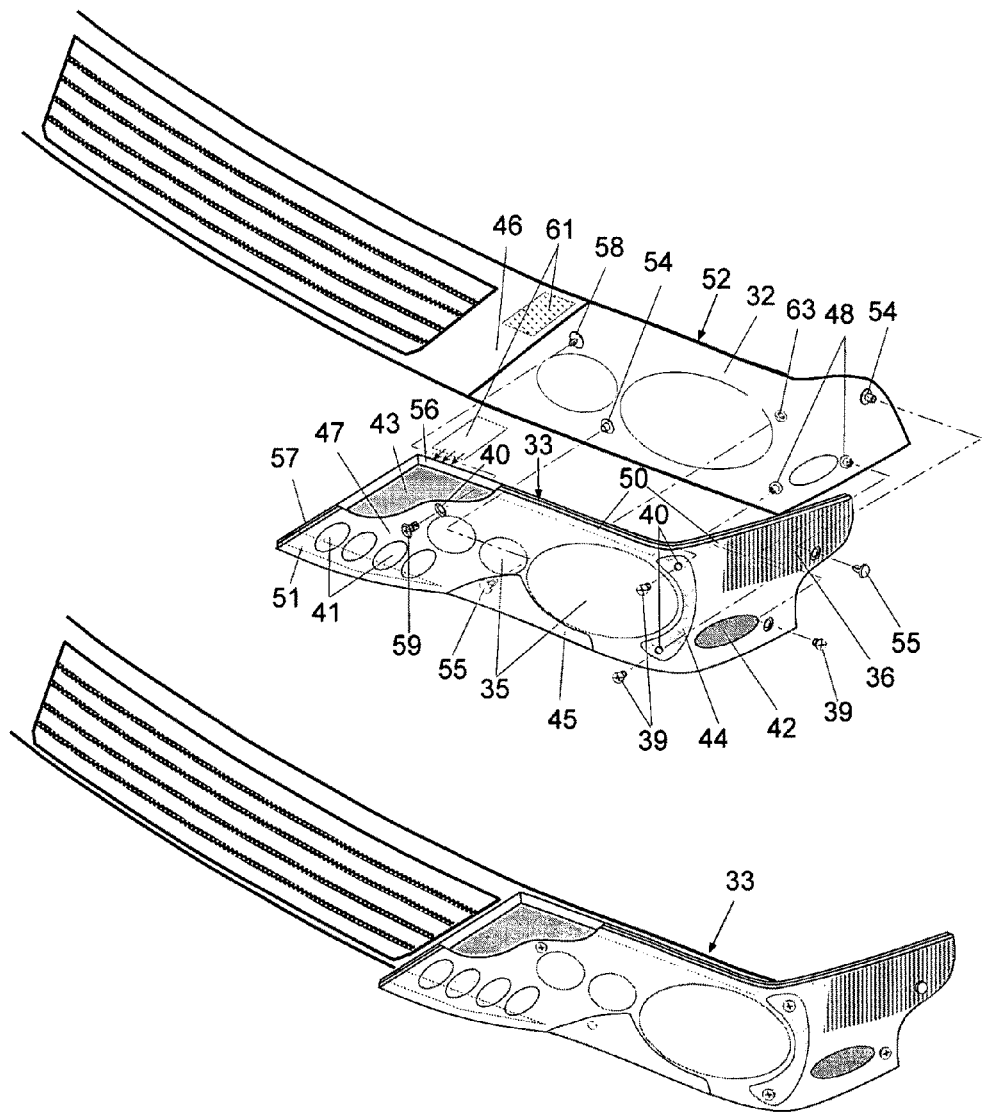
FIG. 11 shows the exploded and final assembly views of the second preferred embodiment with a stand-alone exchangeable lens cover means installed to an existing light module of an automobile.

FIG. 11 shows the exploded and final assembled views of the second preferred embodiment of the stand-alone exchangeable lens cover means 33 attached to an existing head light module 52 of an automobile. The retained mechanical fasteners are installed to the housing 32 of the conventional light module or the automobiles's adjacent body panel 46 via structural attachment means. Examples of the structural attachment means in this application are friction welding, structural adhesive, hot-melt adhesive, insertion into a pre-drilled hole/cavity in the housing or the automobile's adjacent body panels, and spot welding if both the retained mechanical fastener and the adjacent body panel are metal.

The mechanical fasteners in FIG. 11 consist of two male threaded fasteners 39 installed to two female threaded fasteners 48 glued to the housing 32 through through-holes 40 in the exchangeable lens cover means 33, a male threaded fastener 39 installed to a female threaded fastener 63 inserted with interference-fit into a pre-drilled hole in the housing 32 through a through-hole 40 in the exchangeable lens cover means 33, a female twist-lock fastener 59 installed to a male twist-lock fastener 58 glued to the housing 32 through a through-hole 40, a pushpin 55 inserted into a matching receptacle socket 54 glued to the housing 32 through a through-hole 40, a pushpin 55 glued to the inner surface of the exchangeable lens cover means 33 inserted into a matching receptacle socket 54 glued to the housing 32.

Nondestructive removable attachment means used in FIG. 11 are removable adhesive 50 and removable double-sided adhesive tapes 51 for reinforcement. Another nondestructive removable attachment means shown in FIG. 11 is a pair of 3M Dual Lock Reclosable fastener pads 61 with one patch attached to an adjacent body panel 46 and another patch attached to the back side of the exchangeable lens cover means 33.

Figure 12:
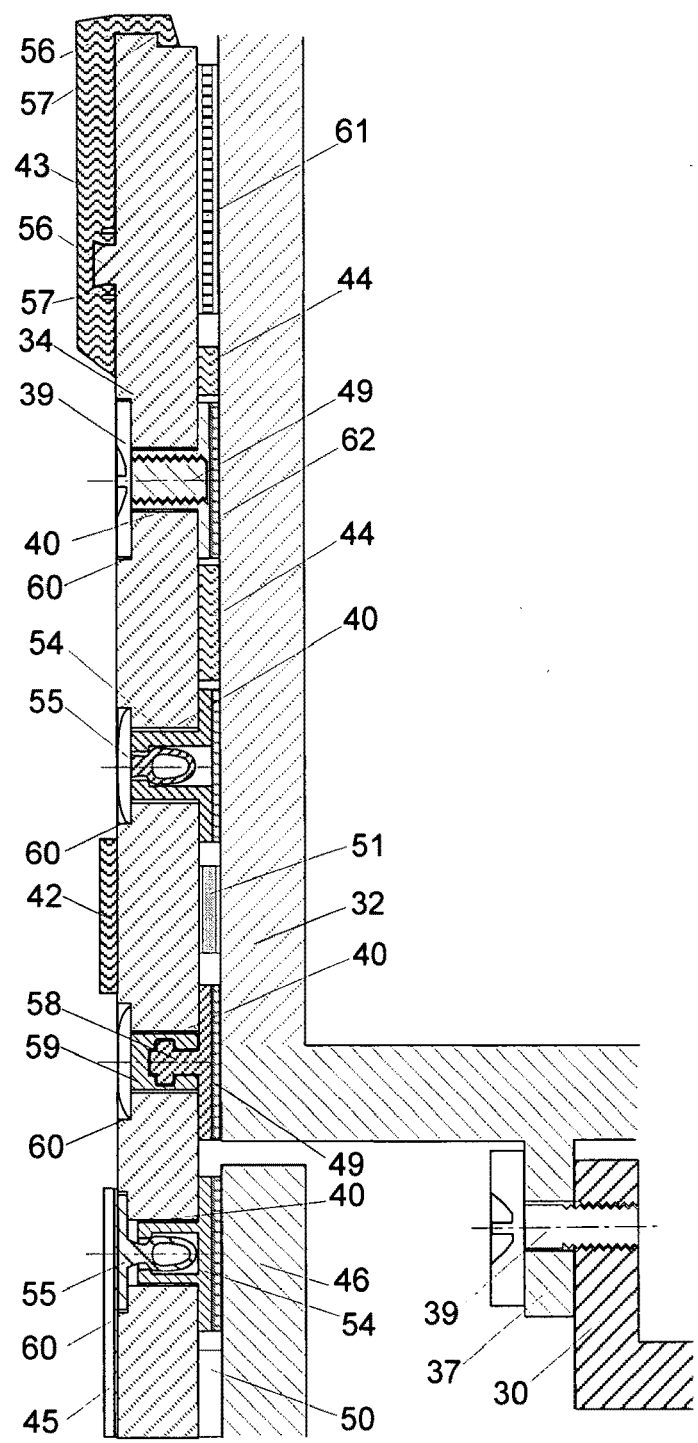
FIG. 12 shows the cross-sectional view of the second preferred embodiment of the modular automotive light system.

The stand-alone exchangeable lens cover means 35 also has add-on styling devices 41, 42, 43, 44, and 45. The cross-sectional view of installation of the exchangeable lens cover means 33 to the housing 32 of the existing head light module 52 is shown in FIG. 12.

The third preferred embodiment has a stand-alone exchangeable lens cover means directly attaches to the body panels via mechanical fasteners as primary attachment with nondestructive attachment means for reinforcement to simulate the styling of a light module of an automobile. This preferred embodiment may be used together with the first or the second preferred embodiment to achieve the maximum styling enhancement.

Figure 13:
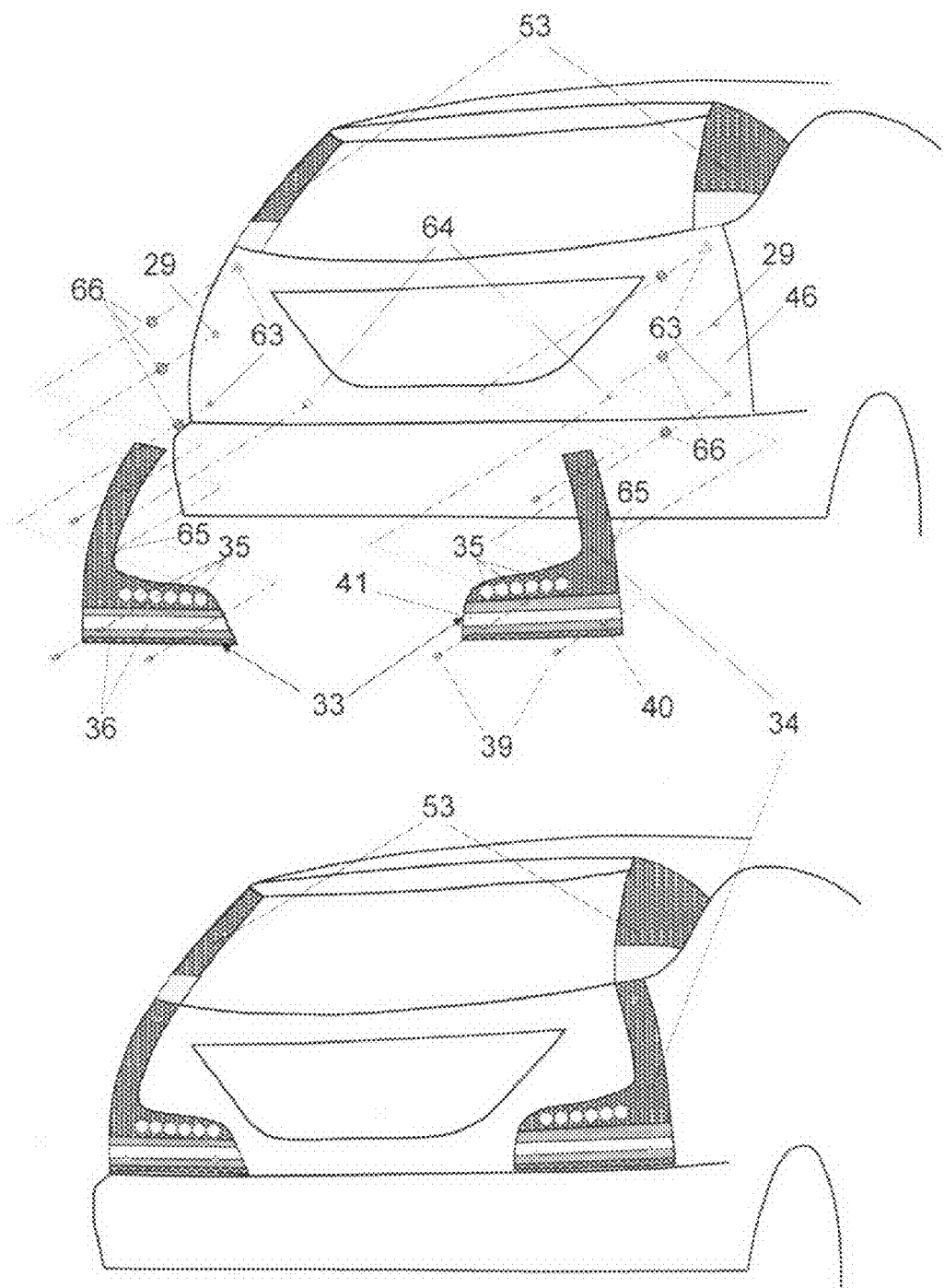
FIG. 13 shows the third preferred embodiment of the modular automotive light system with a stand-alone exchangeable lens cover means attached to the body panels of an automobile.

In this third preferred embodiment, as shown in FIG. 13, an exchangeable lens cover means 33 is attached to the body panels 46 via mechanical fasteners with the retained mechanical fasteners attached via structural attachment means to the body panels as anchors. Examples of structural attachment means appropriate for various types of body panels are structural adhesive, hot-melt adhesive, interference insertion into body panel cavity, friction welding if the body panel is plastic, or spot welding if the body panel is metal. The mechanical fasteners are exemplified in FIG. 13 by two pairs of threaded fasteners 39 and 64 and four pairs of threaded fasteners 39 and 63. The female threaded fasteners 64 are spot-welded to the sheet metal body panels 46 while the female threaded fasteners 63 are inserted with interference into the pre-drilled cavities in the body panels 46.

Nondestructive removable attachment means, such as removable adhesive 50 and removable double-sided adhesive tapes 51 as shown in FIG. 13, are also used to reinforce the attachment by the mechanical fasteners. The plastic lens pieces 34 have integrated styling features 36. Add-on styling devices may also be attached to the plastic lens pieces 34 to further enhance the styling of the exchangeable lens cover means 33.

Figure 14:
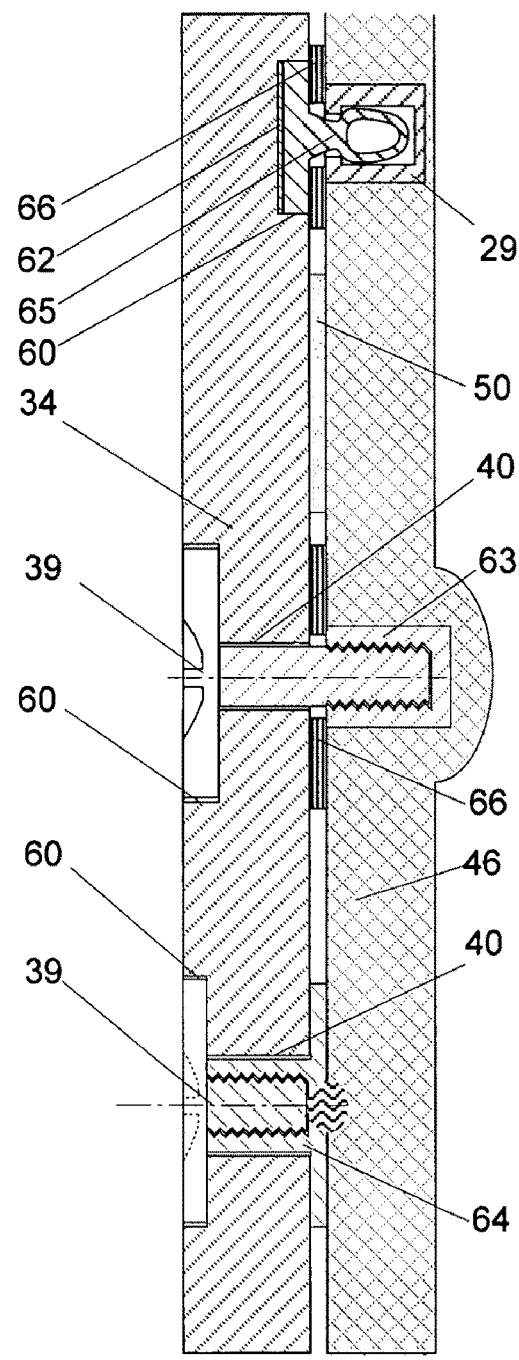
FIG. 14 shows the cross-sectional view of the third preferred embodiment of the modular automotive light system.

FIG. 14 shows the cross-sectional view of the third preferred embodiment with two male threaded fasteners 39 installed to a female threaded fastener 63 inserted with interference-fit to a pre-drilled cavity in the body panel 46 and a female threaded fastener 64 spot-welded to the body panel 46, respectively. A pushpin 65 is installed to a receptacle socket 29 inserted with adhesive into a pre-drilled cavity in the body panel 46 and removable adhesive 50, a nondestructive removable attachment means, is used for reinforcement of the attachment.

Figure 15:
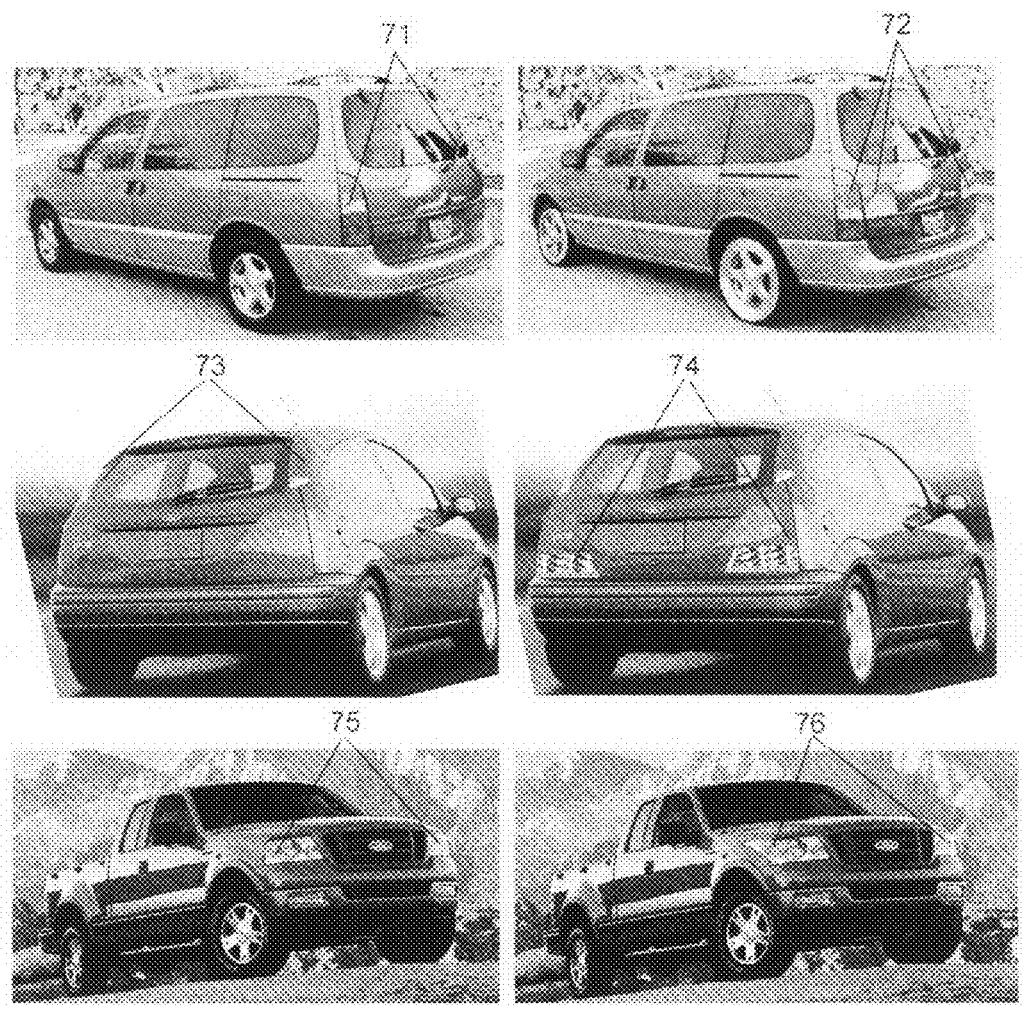
FIG. 15 shows several production automobiles before and after installation of the modular automotive light systems.

FIG. 15 shows automobiles before and after installation of the modular automotive light systems: a Mercury Villager with stock tail light modules 71 and with modular light systems 72 installed; a Ford Focus with stock tail light modules 73 and with modular light systems 74 installed; and a Ford F-150 with stock head light modules 75 and with modular light systems 76 installed.

CONCLUSION, RAMIFICATIONS, AND SCOPE

Thus the reader will see that the modular automotive light system of this invention provides a cost-effective way of customizing an automobile.

While my above description contains many specificities, these should not be construed as limitations on the scope of the invention, but rather as an exemplification of some preferred embodiments thereof. Many other variations are possible. For example, the plastic leans piece may be made of soft plastic, like vinyl, so it can be more compliant to the exterior surface shape of the light module and body panels. The add-on styling devices may also be made of soft plastic for the same reason. There are other nondestructive removable attachment means, such as vacuum suction cups, and mechanical fasteners that can be used to attach the lens cover means to the common base light device, existing light module, or vehicle's body panels. This modular automotive light system may be used for utility or recreational vehicles such as lawn tractors, golf carts, all-terrain vehicles (ATVs), motorcycles, commercial trucks, electrical vehicles, or even construction vehicles which have light modules that carry both lighting and styling features. This modular automotive light system may also serve as a platform for other automotive light enhancement devices such as solar powered LED lights that can be installed to the exchangeable lens cover means to further personalize a vehicle's exterior styling.

I claim:

1. A modular light system for an automobile comprising:
   a. a common base light device comprising an automotive lighting means, a housing enclosing said automotive lighting means, and one or a plurality of mechanical fastener attachment brackets for installation to said automobile,
   b. a multitude of exchangeable lens cover means of which each has substantially distinctive automotive light styling features and an interior shape compatible with the exterior shapes of said housing of said common base light device and, one or a plurality of said automobile's adjacent body panels overlaid by said exchangeable lens cover means when said exchangeable lens cover means is attached to said housing of said common base light device after said common base light device is installed to said automobile, and
   c. a plurality of removable attachment means that removably attach each of said exchangeable lens cover means to said housing of said common base light device and said automobile's adjacent body panels,
   whereby said modular light system is installed to said automobile by having an exchangeable lens cover means with desirable distinctive styling features selected from said a multitude of exchangeable lens cover means removably attached via said removable attachment means to said common base light device after said common base light device is mounted to said automobile via installing mechanical fasteners through said mechanical fastener attachment brackets to said automobile to enhance said automobile's exterior styling.

2. Said modular light system as recited in claim 1 wherein said removable attachment means comprise mechanical fasteners and compatible fastener retaining means.

3. A modular light system for an automobile having a conventional light module with a housing comprising:
   a. a plurality of retained mechanical fasteners attached via structural attachment means to the exterior surface of said housing of said conventional light module,
   b. a plurality of engaging mechanical fasteners compatible with said retained mechanical fasteners,
   c. a multitude of exchangeable lens cover means of which each has distinctive automotive light styling features, an interior shape compatible with the exterior shapes of said housing of said conventional light module and said automobile's adjacent body panels overlaid by said exchangeable lens cover means when said exchangeable lens cover means is attached to said housing of said conventional light module, and fastener retaining means compatible with said engaging mechanical fasteners and said retained mechanical fasteners, and
   d. each of said exchangeable lens cover means can be removably attached to said housing of said conventional light module via installation of said engaging mechanical fasteners through said fastener retaining means to said retained mechanical fasteners,
   whereby said modular light system is installed to said automobile by having an exchangeable lens cover means with desirable distinctive styling features selected from said a multitude of exchangeable lens cover means removably attached to said housing of said conventional light module to enhance said automobile's exterior styling.

4. Said modular light system as recited in claim 3 wherein said fastener retaining means comprise structural attachment means between said exchangeable lens cover means and said engaging mechanical fasteners that structurally attach said engaging mechanical fasteners to said exchangeable lens cover means when said engaging mechanical fasteners are installed to said retained mechanical fasteners through said fastener retaining means.

5. Said modular light system as recited in claim 3 wherein said fastener retaining means comprise through-holes in said exchangeable lens cover means that have diameters larger than the stems of said engaging mechanical fasteners but smaller than the heads of said engaging mechanical fasteners.

6. Said modular light system as recited in claim 3 further comprising nondestructive removable attachment means installed between said exchangeable lens cover means and said housing of said conventional light module and said automobile's adjacent body panels of said automobile.

7. A modular light system for an automobile comprising:
   a. a plurality of retained mechanical fasteners attached via structural attachment means to the exterior surface of said automobile's body panels of said automobile,
   b. a plurality of engaging mechanical fasteners compatible with said retained mechanical fasteners,
   c. a multitude of exchangeable lens cover means of which each has distinctive automotive light styling features, an interior shape compatible with the exterior shapes of said automobile's body panels overlaid by said exchangeable lens cover means when said exchangeable lens cover means is attached to said automobile's body panels, and fastener retaining means compatible with said engaging mechanical fasteners and said retained mechanical fasteners, and
   d. each of said exchangeable lens cover means can be removably attached to said automobile's body panel via installation of said engaging mechanical fasteners through said fastener retaining means to said retained mechanical fasteners, whereby said modular light system is installed to said automobile by having a exchangeable lens cover means with desirable distinctive styling features selected from said a multitude of exchangeable lens cover means removably attached to said automobile's body panels to enhance said automobile's exterior styling.

8. Said modular light system as recited in claim 7 wherein said fastener retaining means comprise structural attachment means between said exchangeable lens cover means and said engaging mechanical fasteners that structurally attach said engaging mechanical fasteners to said exchangeable lens cover means when said engaging mechanical fasteners are installed to said retained mechanical fasteners through said fastener retaining means.

9. Said modular light system as recited in claim 7 wherein said fastener retaining means comprise through-holes in said exchangeable lens cover means that have diameters larger than the stems of said engaging mechanical fasteners but smaller than the heads of said engaging mechanical fasteners.

10. Said modular light system as recited in claim 7 further comprising nondestructive removable attachment means installed between said exchangeable lens cover means and said automobile's body panels of said automobile.

* * * * *